US006321015B1

(12) United States Patent
Doran et al.

(10) Patent No.: US 6,321,015 B1
(45) Date of Patent: Nov. 20, 2001

(54) OPTICAL FIBRE COMMUNICATION SYSTEM

(75) Inventors: Nicholas John Doran, Coventry; Jeroen Henricus Bernardus Nijhof, Birmingham, both of (GB)

(73) Assignee: BTG International Limited, London (GB)

( * ) Notice: Subject to any disclaimer, the term of this patent is extended or adjusted under 35 U.S.C. 154(b) by 0 days.

(21) Appl. No.: 09/656,966

(22) Filed: Sep. 7, 2000

Related U.S. Application Data

(63) Continuation of application No. 09/494,246, filed on Jan. 31, 2000, which is a continuation of application No. PCT/GB98/02291, filed on Jul. 30, 1998.

(30) Foreign Application Priority Data

Jul. 31, 1997 (GB) .................................................. 9716230

(51) Int. Cl.$^7$ ....................................................... G02B 6/10
(52) U.S. Cl. .............................................. 385/123; 385/37
(58) Field of Search ................................. 385/123, 24, 37

(56) References Cited

U.S. PATENT DOCUMENTS

| | | | |
|---|---|---|---|
| 5,508,845 | * | 4/1996 | Frisken . |
| 5,513,194 | * | 4/1996 | Tamura et al. . |
| 5,612,808 | * | 3/1997 | Audouin et al. . |
| 5,764,841 | * | 6/1998 | Iwatsuki et al. . |
| 6,122,088 | * | 9/2000 | Hasegawa . |

FOREIGN PATENT DOCUMENTS

| | | |
|---|---|---|
| 0 777 347 A | 6/1997 | (EP) . |
| 0 777 347 A2 | 6/1997 | (EP) . |
| 0 777 347 A3 | 4/1998 | (EP) . |

OTHER PUBLICATIONS

Nakazawa M et al: "Nonlinear Pulse Transmission through an optical fiber at zero–average group velocity dispersion" IEEE Photonics Technology Letters, vol. 8, No. 3, Mar. 1996, pp 452–454, XP002086273.

Zhang et al: "Optical Soliton Propagation in a Positively and Negatively dispersion–allocated Fiber" Communication Technology Proceedings, ICCT. vol. 1, May 5–7, 1996, pp 319–322, XP002086274.

Golovchenko E A et al: "Collision–induced Timing Jitter Reduction by Periodic Dispersion Management in Soliton WDM Transmission" Electronics Letters, vol., 33, No. 9, Apr. 24, 1997, pp. 735–737, XP000695298.

Suzuki, M., Morita, I., Edagawa, N., Yamamoto, S., Taga, H., and Akiba, S., 'Reduction of Gordon–Haus timing jitter by periodic dispersion compensation in soliton transmission', Electron. Lett., 1995, 31 (23), pp. 2027–2029.

Smith N J, Knox, F M, Doran N J, Blow K J, and Bennion I, "Enhanced power solitons in opticals fibres with periodic dispersion management" Electron Lett, 1996, 32 (1), pp54–55.

Smith N J, Forysiak W, and Doran N J, "Reduced Gordon–Haus jitter due to enhanced power solitons in strongly dispersion managed systems", Electron Lett, 1996, 32, (22), pp2085–2086.

Suzuki, M. et al., Reduction of Gordon–Haus Timing Jitter by Periodic Dispersion Compensation in Soliton Transmission, *Electronics Letters* 31, 2027–2029 (1995).

(List continued on next page.)

*Primary Examiner*—Hung N. Ngo
(74) *Attorney, Agent, or Firm*—Nixon & Vanderhye

(57) ABSTRACT

A soliton or soliton-like pulse-based optical communication system comprises a length of optical fibre divided into a plurality of sections arranged so that the average dispersion of the length of fibre is significantly different from the dispersion of each section.

17 Claims, 9 Drawing Sheets

OTHER PUBLICATIONS

Smith, N. J. et al., Enhanced power solitons in opticals fibres with periodic dispersion management, *Electronics Letters* 32, 54–55 (1996).

Smith, N. et al., Reduced Gordon–Haus Jitter due to Enhanced Power Solitons in Strongly Dispersion Managed System, *Electronics Letters* 22, 2085–2086 (1996).

Smith, N. J. et al., Energy–scaling characteristics of solitons in strongly disperson–managed fibers, *Optics Letters* 21, 1981–1983 (1996).

Nakazawa, N. et al., Nonlinear Pulse Transmission Through an Optical Fiber at Zero–Average Group Velocity Dispersion, *IEEE Photonics Technology Letters* 8, 452–454 (1996).

Zhang, C. et al., Optical Soliton Propagation in a Positively and Negatively Dispersion–allocated Fiber *Communication Technology Proceedings, ICCT* 1, 319–322 (1996).

Golovchenko, E. A. et al., Collision–induced timing jitter reduction by periodic dispersion management in soliton WDM transmission, *Electronics Letters* 33, 735–737 (1997).

* cited by examiner

OPTICAL FIBRE COMMUNICATION SYSTEM

This application is a continuation of Ser. No. 09/494,246 filed Jan. 31, 2000, which is a continuation of PCT/GB98/02291 filed Jul. 30, 1998.

This invention relates to optical fibre communication systems and, in particular to communication systems which employ solitons or soliton-like pulses for data transmission. It is also applicable to systems in which the launch pulse may be phase modulated return-to-zero (RTZ). In such systems, which are not obviously soliton-like, after travelling a distance, the pulses are transformed into soliton-like pulses.

BACKGROUND OF THE INVENTION

It has recently been shown that a new class of optical solitons occur in dispersion managed systems where alternating sections of negative (anomalous) and positive (normal) dispersion fibre are used. (See, for example, Suzuki, M., Morita, I., Edagawa, N., Yamamoto, S., Taga, H., and Akiba, S., 'Reduction of Gordon-Haus timing jitter by periodic dispersion compensation in soliton transmission', *Electron. Lett.*, 1995, 31, (23), pp. 2027–2029, Smith, N. J., Knox, F. M., Doran, N. J., Blow, K. J., and Bennion, I., 'Enhanced power solitons in optical fibres with periodic dispersion management', *Electron. Lett.*, 1996, 32, (1), pp54–55 and Smith, N. J., Forysiak, W., and Doran, N. J., 'Reduced Gordon-Haus jitter due to enhanced power solitons in strongly dispersion managed systems', *Electron. Lett.*, 1996, 32, (22), pp2085–2086.

In a further paper entitled 'Energy scaling characteristics of solitons in strongly dispersion-managed fibres', *Opt. Lett.*, 1996. 21, (24), pp1981–1983, Smith et al. derived an empirical relationship for the enhanced power of these solitons, where the average dispersion is anomalous and significantly less (in magnitude) than the dispersion in the two segments. These lossless calculations showed the importance of the launch point in the map (the minimum chirp is at the centre of either section), but did not establish the exact pulse shape, nor the long term stability of the pulses.

DESCRIPTION OF THE INVENTION

We have discovered that by using dispersion management, in which an optical communication system uses alternative sections of fibre of opposite sign of dispersion, that transmitted pulses are not distorted (neither dispersively nor effectively nonlinearly) provided the correct form of the pulse is selected. It is possible to have stable pulses (solitons) where the net dispersion is zero, normal or anomalous. There are no solitons for normal dispersion, but pulses are also stable in this regime. This permits wavelength multiplexing around the zero dispersion since, although the dispersion depends on wavelength, it is unavoidable that both signs will occur. However, the new arrangement permits solitons to be used for a wide range of wavelengths.

We have found that the shape of pulse is significant. For these systems it is important to pre-chirp the pulse in an appropriate way. The degree of chirp and pulse duration depends on the data rate required and how the map is designed.

We have also discovered that for zero net dispersion there appears a preferred pulse duration for a particular map. The ratio $$\frac{\beta l}{\tau} \sim 4,$$

where $\beta$ is the fibre dispersion, $\tau$ is the pulse duration and $l$ is the fibre length. It means that the system (for the zero dispersion case) is specified by the pulse duration (effectively the data rate) and the dispersion of the fibres i.e. the length of each section can be immediately inferred. For example if $\tau$=20 ps (10 Gb/s) and $\beta$~20 ps$^2$/km (standard fibre), then the fibre lengths should be 80 km. Alternatively, if $\beta$=1 ps$^2$/km (dispersion shifted fibre typical number) then 1600 km is ideal. Numerical modelling indicates that there are stable nonlinear transmission pulses for periodically dispersion managed systems where the path average dispersion may be either anomalous, zero, or even normal.

A new class of stable pulses is demonstrated to exist when the average dispersion is zero or even normal. The discovery of these stable pulses allows the use of solitons in WDM systems around the zero (average) dispersion, where due to dispersion slope effects both signs of dispersion are inevitable.

According to one aspect of the present invention there is provided a soliton or soliton-like pulse-based optical communication system comprising a length of optical fibre divided into a plurality of sections wherein the average dispersion of the length of fibre is significantly different from the dispersion of each section.

According to a further aspect of the present invention there is provided a soliton or soliton-like pulse-based optical communication system comprising a length of optical fibre divided into a plurality of sections wherein the average dispersion of the length of fibre is significantly different from the dispersion of each section and wherein the pulse duration $\tau$ is substantially equal to ¼$\beta l$ where $\beta$ is the fibre dispersion, $\tau$ is the pulse duration and $l$ is the fibre length.

BRIEF DESCRIPTION OF THE DRAWINGS

The invention will be particularly described by way of example, with reference to the accompanying drawings, in which.

DETAILED DESCRIPTION OF THE INVENTION

We have performed extensive numerical investigations on a two stage map for individual pulses, ignoring loss in the first instance. Our procedure is first to accurately establish the long distance stable solution if it exists. In general, if one starts with some reasonable initial pulse shape and size, then the pulse width, taken at a fixed point in each cycle, will oscillate over many cycles, as some radiation is shed and the long term stable pulse emerges. We use this effect by averaging the pulse shapes at the extreme of these oscillations to rapidly find the converged wave form with high accuracy. We can then remove the averaging to check the stability of the converged pulses.

Figure 1:
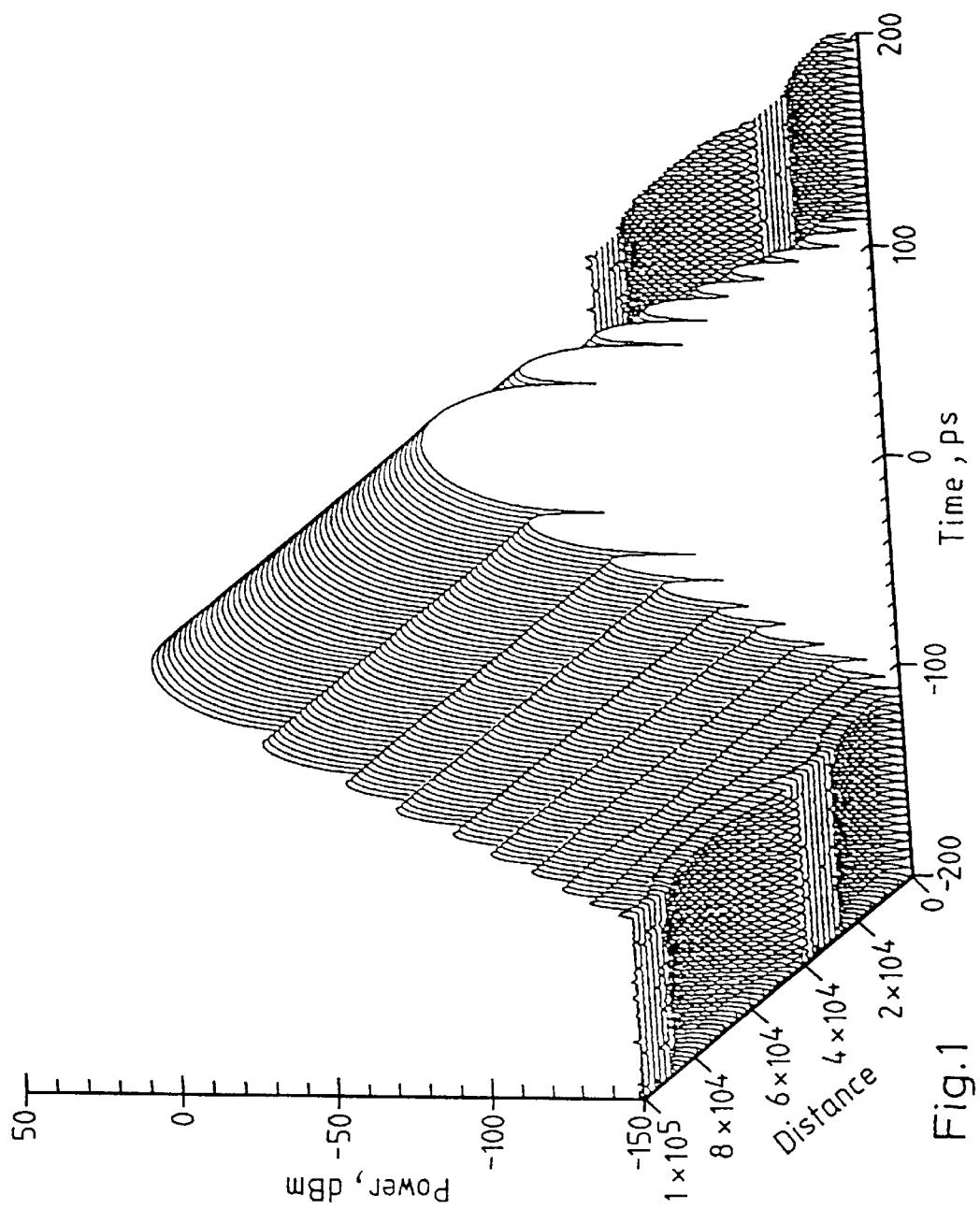
FIG. 1 shows propagation for 100 000 km for a pulse with E=0.03 pJ, and 100 km sections of $\beta''$=−5.1 ps$^2$/km and fl"=4.9 ps$^2$/km. The pulse is shown at the mid point of the anomalous section
Figure 2:
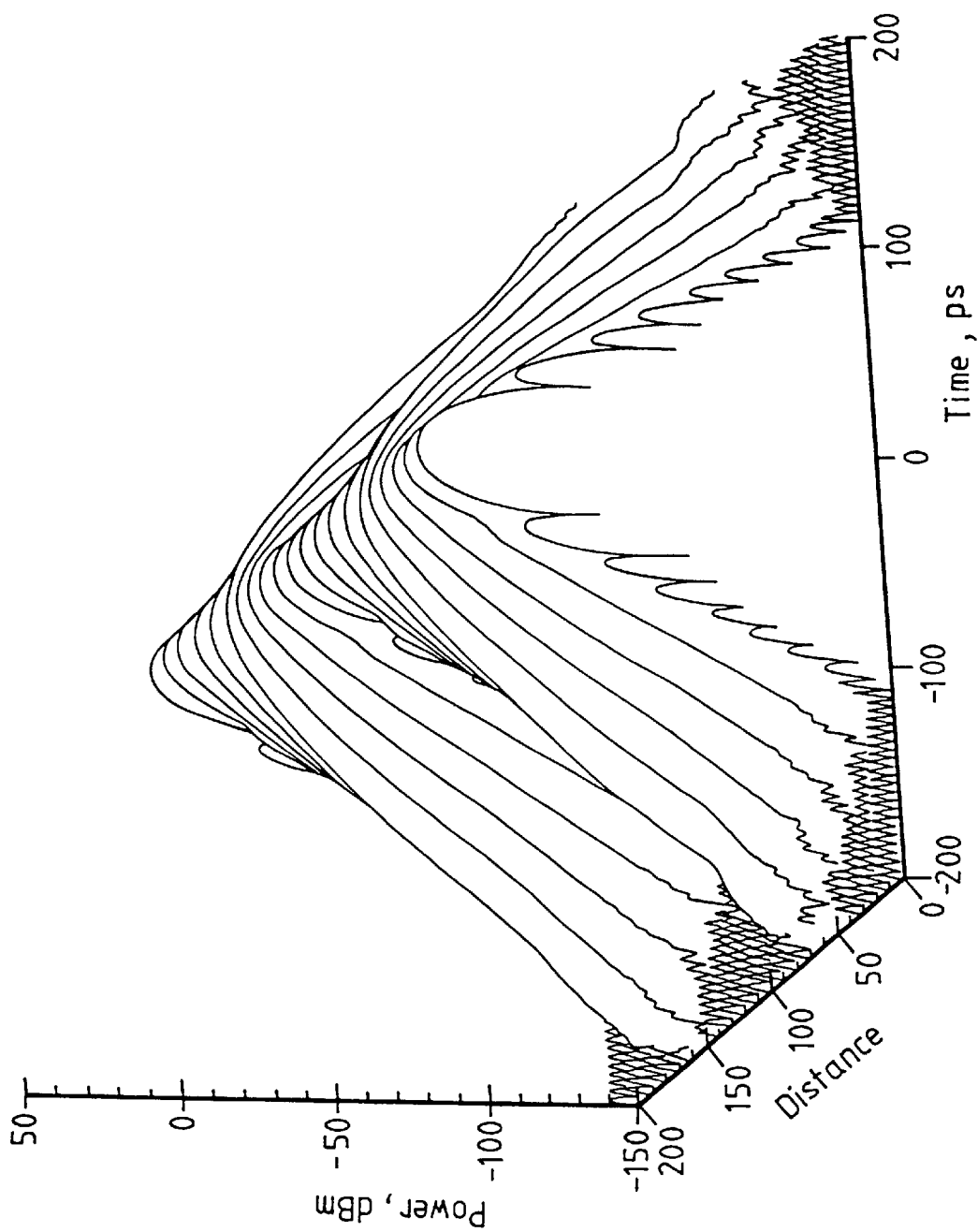
FIG. 2 shows propagation over one cycle for a pulse with E=0.03 pJ, and 100 km sections of $\beta''$=−5.1 ps$^2$/km and $\beta''$=4.9 ps$^2$/km

Using this technique we have discovered that long term stable pulses can indeed be obtained, provided that the average dispersion is significantly different from the dispersion in each section. FIG. 1 shows an example of such a pulse for a deep map with net anomalous dispersion and a power enhancement factor of 4.5. The evolution shows no evidence of radiation and is shown on a log scale to illustrate the extreme stability observed. FIG. 2 shows the evolution during one period of the map. At the mid point of each section, the pulse has a curved (Gaussian) centre and linear (exponential) wings with dips. At these points the pulse is totally unchirped, i.e. exactly in phase, and the dips are zeroes, roughly periodic in $t^2$. At the boundary between sections, where the pulse is widest, it becomes more sech-like (exponential) and is strongly chirped. These observations are typical for strong dispersion maps. Contrary to normal assumptions, the pulse is not self-similar during one cycle, i.e. the power spectrum also evolves.

Figure 3:
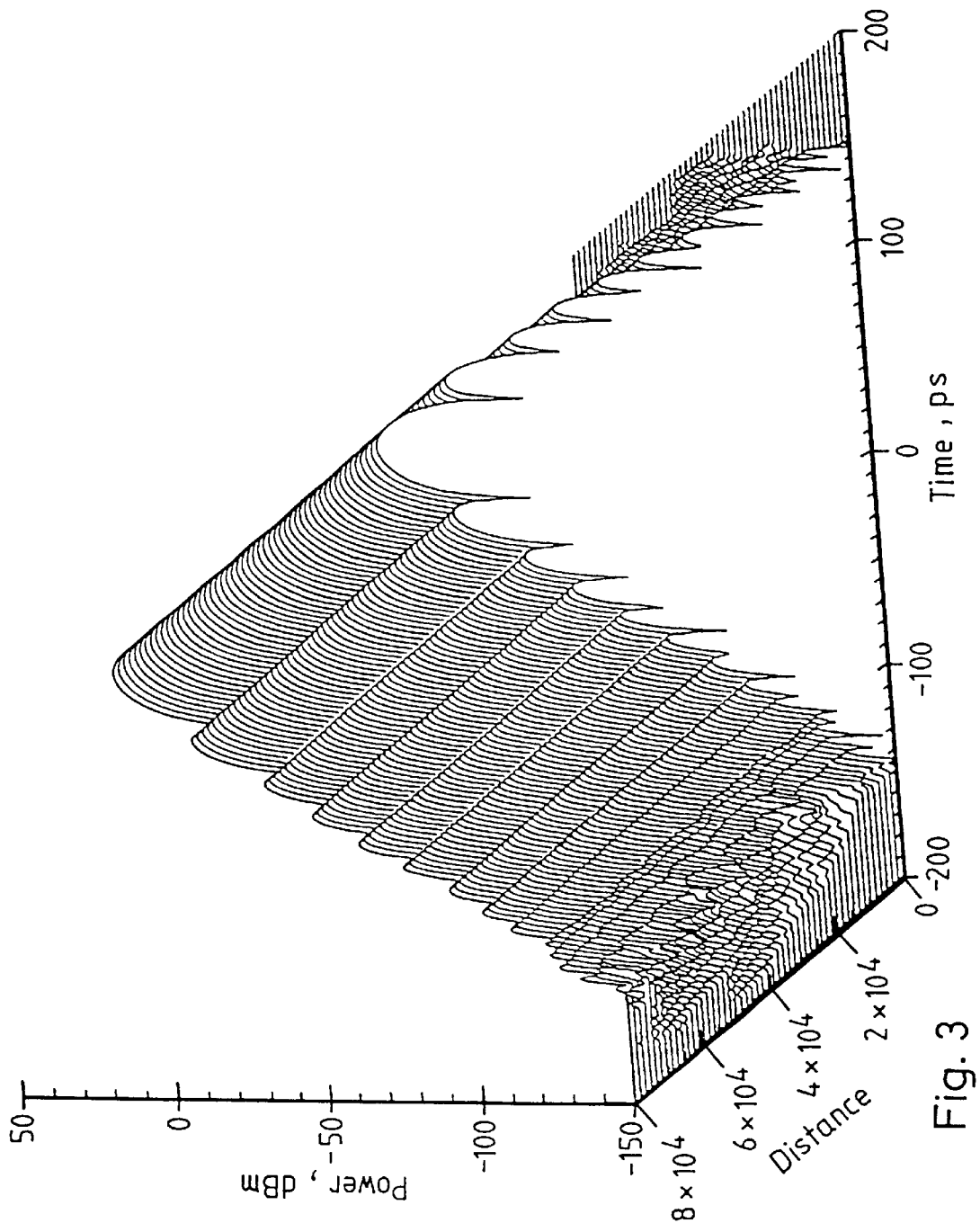
FIG. 3 shows stable propagation for 80 000 km at net zero dispersion for a pulse with E=0.2 pJ, and 80 km segments of $\beta''$=±10 ps$^2$/km. The pulse is shown at the mid point of the anomalous section.

The most surprising result of our investigation is that such stable pulses exist not only for many different types of map with average anomalous dispersion, but also for maps with exactly balancing sections, i.e. zero average dispersion, and even where the average dispersion is normal. In each case the pulse is similar to the one illustrated in FIGS. 1 and 2. For instance, FIG. 3 shows a stable pulse for one case where there is no net dispersion. This is a remarkable result, since this pulse is certainly nonlinear and there is no net dispersion against which to balance the nonlinearity in a conventional sense, yet the pulse does not show any spectral broadening. In this case it is clearly inappropriate to discuss a power enhancement, but for the parameters of FIG. 3 the pulse energy is equivalent to that of a conventional soliton with the same width for a constant dispersion of $-2.5$ ps$^2$/km. This is clearly a significant energy and will allow stable soliton-like operation at zero dispersion. Indeed we have found that, in contrast to what is seen in systems without dispersion control, including third order dispersion of 0.07 ps/km does not lead to a break-up of the pulse.

In the case of net normal dispersion, we have the equally surprising result that dispersion management allows exact nonlinear suppression of dispersion for these bright soliton-like pulses. We have obtained stable pulses for small values of the net normal dispersion, e.g. 80 km segments with a dispersion of $-10$ ps$^2$/km and $+0.8$ ps$^2$/km respectively. This of course is not possible with conventional bright solitons for uniform normal dispersion.

Figure 4:
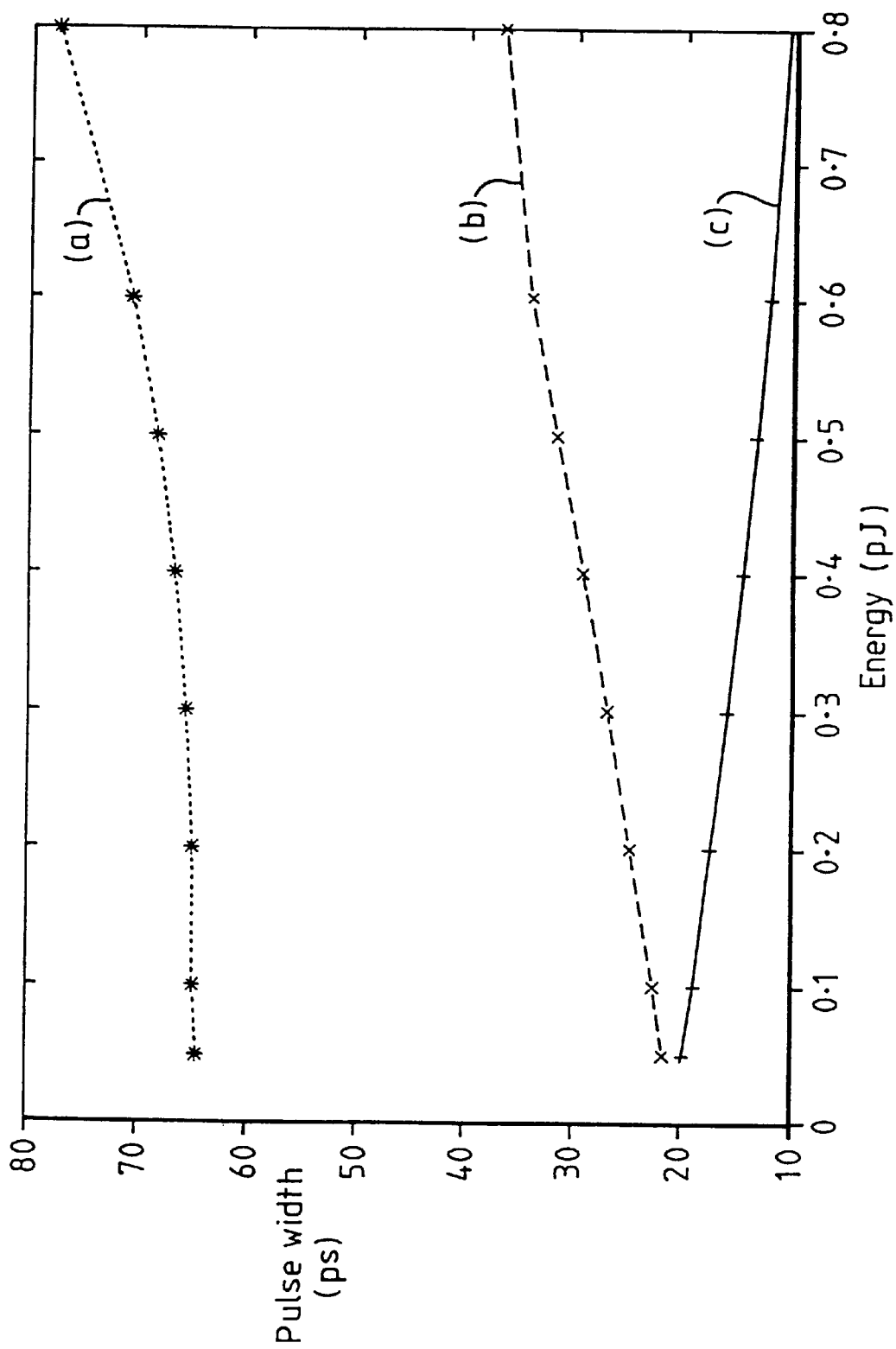
FIG. 4 shows the pulse width versus energy for a dispersion map with zero average dispersion. (a) at the segment boundary, (b) in the mid point of the normal segment, (c) in the mid point of the anomalous segment.

We have also investigated the dependence of the pulse width on the energy. For illustration, we consider the case of zero average dispersion, where there is effectively only one independent parameter after appropriate scaling. FIG. 4 shows the energy dependence of the pulse width for a particular map ($l_{1,2}=80$ km and, $\beta_{1,2}=\pm 10$ ps$^2$/km). There is a nearly linear dependence on energy of the pulse width, increasing in the normal fibre and decreasing in the anomalous fibre, in contrast to conventional solitons, where the energy is inversely proportional to the pulse width, so that the pulse width goes to infinity as the energy goes to zero.

Here we have observed that for a particular map there appears to be a 'preferred' optimal pulse width for small pulse energies.

We have also performed extensive studies of our new stable pulse and discovered that the energy enhancement depends on the average dispersion and the depth of the map in a complex manner.

The remarkable stability and the possibility of ultra-stable soliton-like propagation for dispersion of either sign (or zero) clearly implies that high data rate long distance soliton communication should be possible around the net zero dispersion. By operating at very low average dispersion, timing jitter effects can be virtually eliminated for a range of wavelengths, thus allowing WDM without the need for sliding filters nor active control.

Stable dispersion managed soliton-like pulses exist for anomalous and zero, as well as for normal, average dispersion. The region of observation is extensive in the net anomalous dispersion and therefore these pulses are suitable for long distance and WDM systems. Appropriately tailored initial pulses can be obtained from our numerical procedure, to achieve optimal performance. The correct pulse shape depends on the position in the cycle and thus on the launch point.

The region of allowed dispersion is considerably extended if the anomalous element is longer (or more nonlinear) than the normal fibre(element). Thus gratings for dispersion compensation will allow larger net normal dispersion for the same map strength. Thus there is a wider wavelength range for the asymmetric map with the anomalous section the longer one. (The reverse is true if the asymmetry is the other way around).

Dispersion managed solitons are excellent media for high-speed optical communication. Compared to standard solitons, their power is enhanced, they can propagate at zero and normal average dispersion, leading to reduced Gordon-Haus jitter, reduced pulse interaction and increased noise margins. We have found that by using asymmetric maps the soliton power can be further enhanced and the accessible bandwidth in the normal average dispersion regime can be increased. For systems using wavelength- division- multiplexing (WDM), asymmetric maps can equalise the soliton power in adjacent channels. The critical map strength, however, is unaffected by the map asymmetry, and the optimal strength for dispersion managed soliton systems is of the order 4.

In a two-stage map, where the dispersion alternates between normal and anomalous the pulse evolution is modelled by the nonlinear Schrödinger (NLS) equation $$iu_z = \frac{\beta''}{2}u_{tt} + \gamma|u|^2 u$$

where z is the distance of propagation, t is the local time, $\beta''$ and $\gamma$ are the dispersion and the nonlinear coefficient of the fibre, respectively. The pulse evolution in lossy fibres can also be modelled by this equation as long as the amplification period is different from the period of dispersion management. The stationary solutions in a two-stage map are characterised by three parameters, the map strength, $S=|\beta''_1 L_1 - \beta''_2 L_2|/\tau_{FWHM}$ (subscript 1 and 2 refer to the normal and the and the anomalous dispersion fibre, respectively, $L_n$ are the fibre lengths and $\tau_{FWHM}$ is the full width at half maximum at the mid-point of the anomalous fibre), the normalised average dispersion, $\beta''=\beta''_{ave}/\beta''_2$ ($\beta''$ is the average dispersion) and the map asymmetry $\delta=(\delta_1/\beta''_1)/$ ($\gamma_2/\beta''_2$). The map strength is the normalised length of the dispersion map, $\beta''$ is the average dispersion in fractions of the local dispersion of the anomalous fibre, the map asymmetry indicates how equal the fibres are with respect to nonlinear effects. For two fibres with equal nonlinear coefficients ($\gamma=\gamma$), $\delta$ is the ratio of the dispersions and around zero average dispersion this is just the ratio of the lengths, $\delta=L_1/L_2$.

Figure 5A:
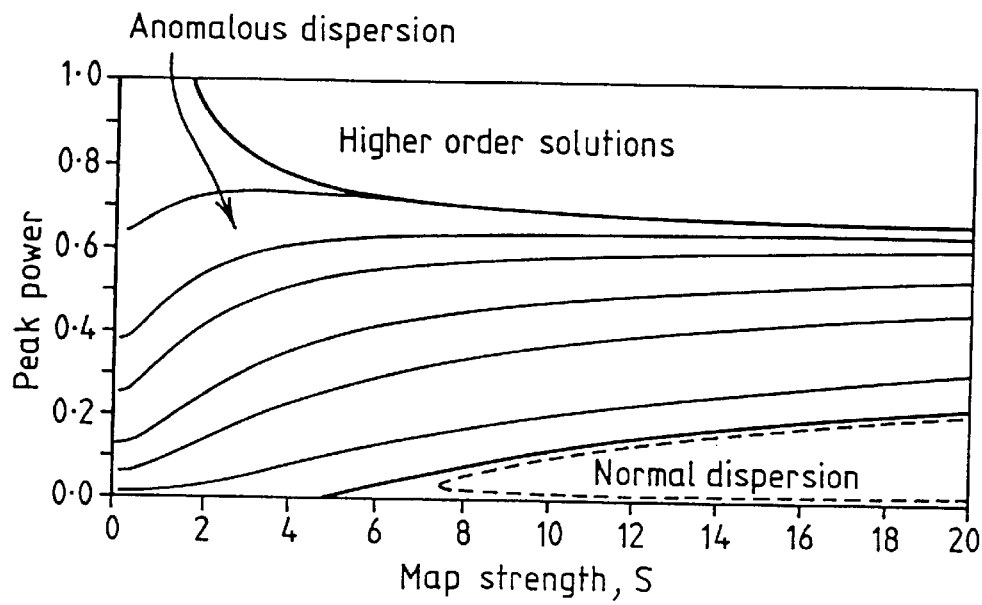
FIGS. 5 to 7 are dispersion maps illustrative of the invention.
Figure 5B:
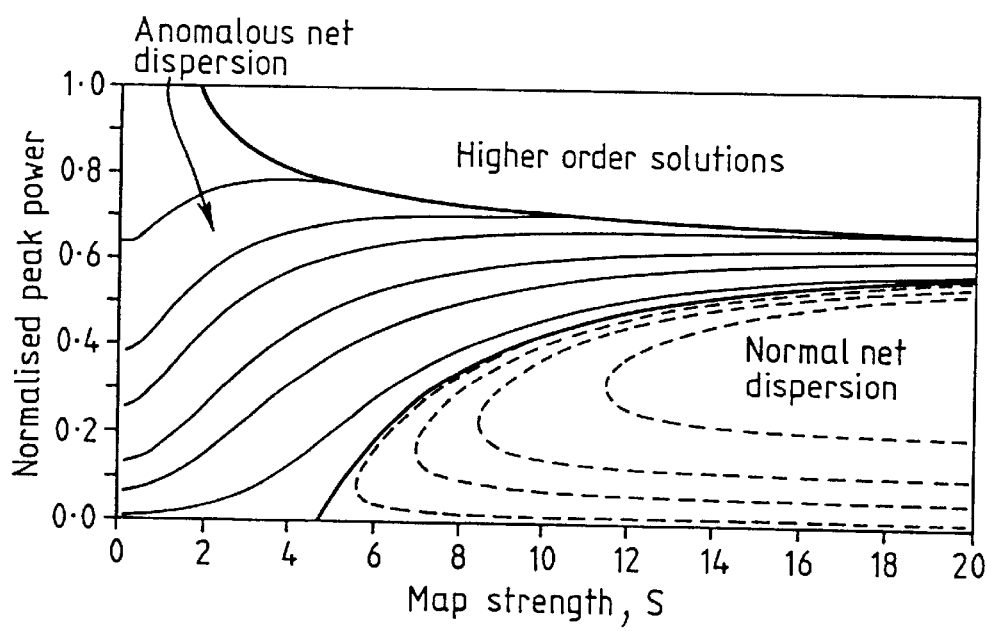
Figure 5C:
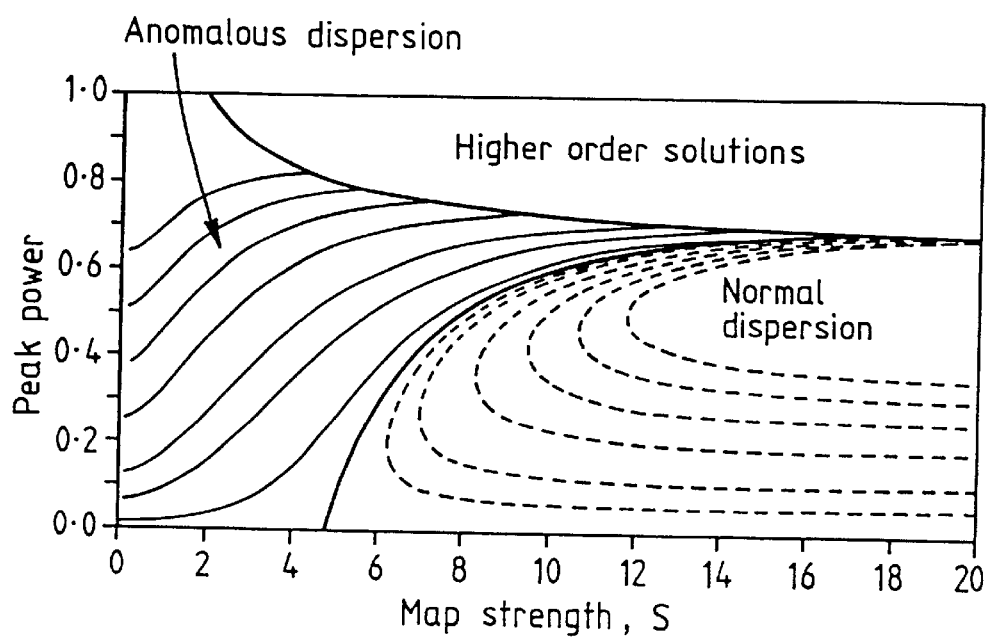
Figure 6A:
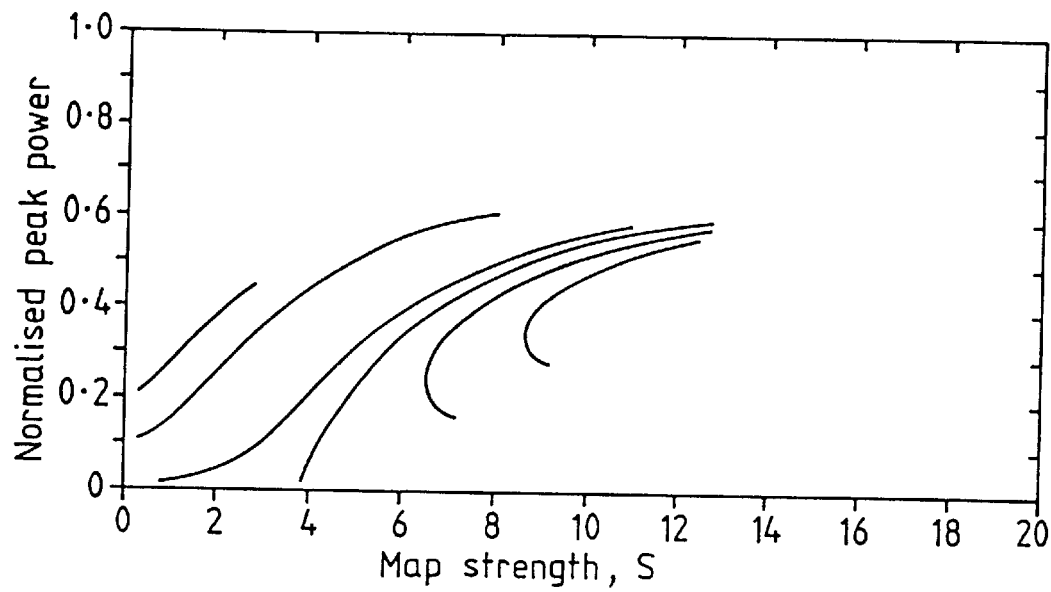
Figure 6B:
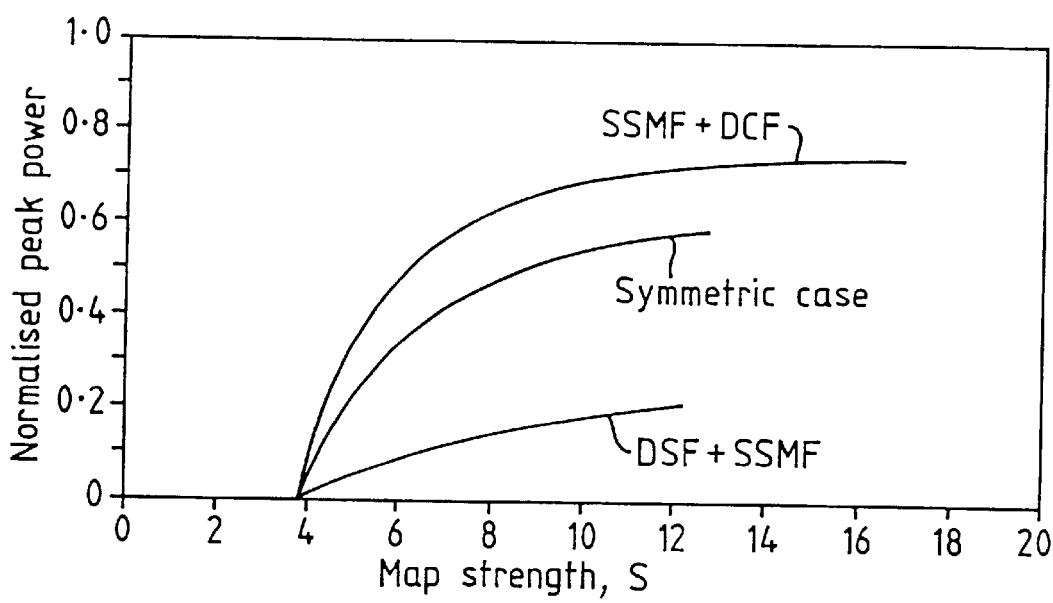

By using the variational approach of A. Bemtson, N. J. Doran, W. Forysiak and J. H. B. Nijhof, *Opt. Lett.* and D. Anderson, *Phys. Rev. A* 27, 3135 (1983), we can calculate approximately the normalised power, $N^2=\gamma_2 P_0 \tau^2_{FWHM}/|\beta''_2|$ of the dispersion managed soliton as function of map strength S, normalised average dispersion and map asymmetry $\delta$, without further assumptions. The physical significance of $N^2$ is that it represents the power in fractions of the fundamental soliton power at the mid-point of the anomalous dispersion fibre. The result of this calculation is shown in FIG. 5 for three cases with different asymmetry. FIG. 5a ($\delta=10$) shows the case of dispersion-shifted fibre (DSF) compensated by standard fibre (SSMF), FIG. 5b ($\delta=1$) illustrates the symmetric case (equal magnitude of the dispersion), and FIG. 5c ($\delta=0.1$) shows the case of SSMF upgraded by dispersion compensation fibre (DCF). The figures are contour plots, each line corresponding to fixed normalised average dispersion in the map strength/power plane. The variational predictions of FIG. 5 were qualitatively verified by numerical simulations presented in FIG. 6.

The basic structure of the maps of FIGS. 5a–c is the same. In each, there is a critical strength, S,=4.8 (numerically S.=3.9, see FIG. 6b), for propagation at zero and normal average dispersion. The critical strength is independent of the map asymmetry. The lower energy branch in the normal dispersion region is unstable and cannot be found numerically, see FIG. 6a. The changes in FIG. 5 as the map asymmetry is decreased, is that the dispersion is shifted towards more anomalous (or less normal) on the average, i.e. the region for normal average dispersion grows when going from FIG. 5a to FIG. c. This can be explained by noting that in the normal dispersion fibre nonlinear and dispersive effects cause a frequency chirp of the same sign. Nonlinear chirping can then replace dispersive chirping and the normal fibre can be shortened as it becomes more nonlinear.

Figure 7A:
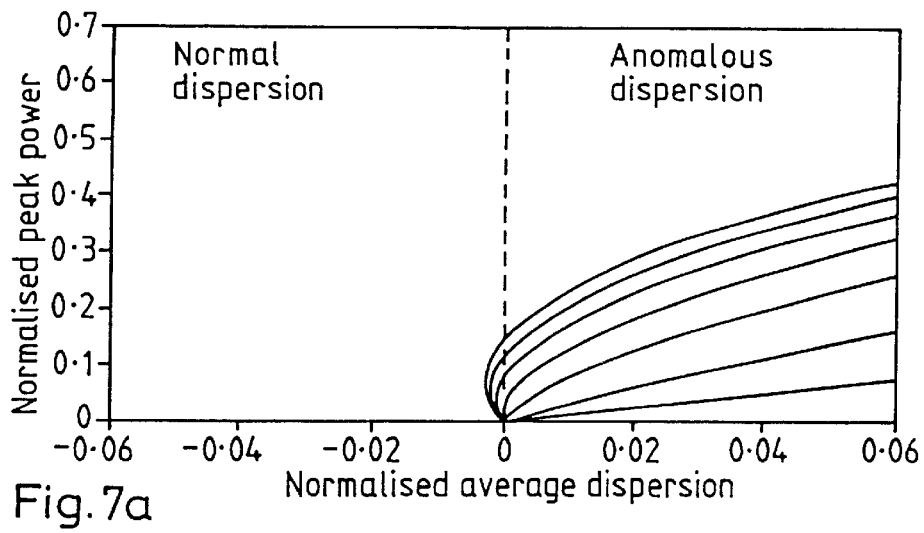
Figure 7B:
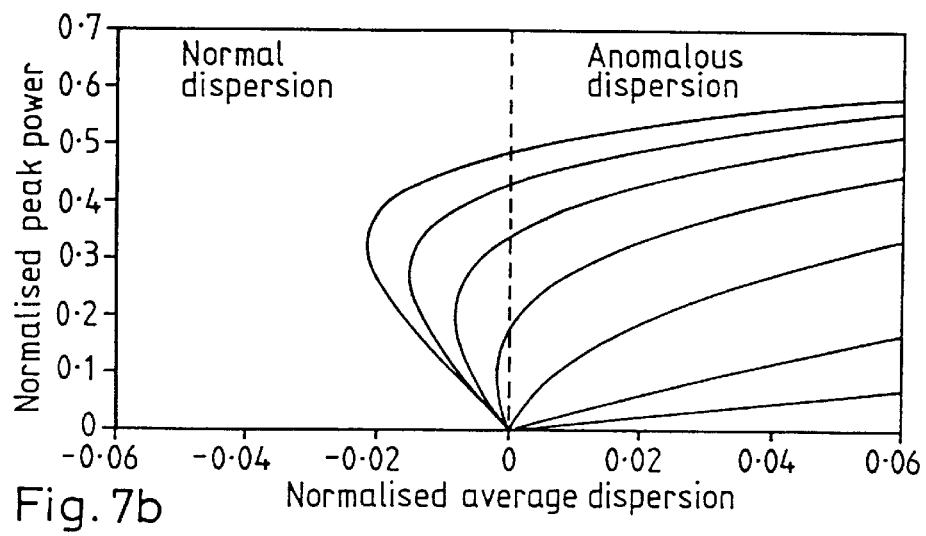
Figure 7C:
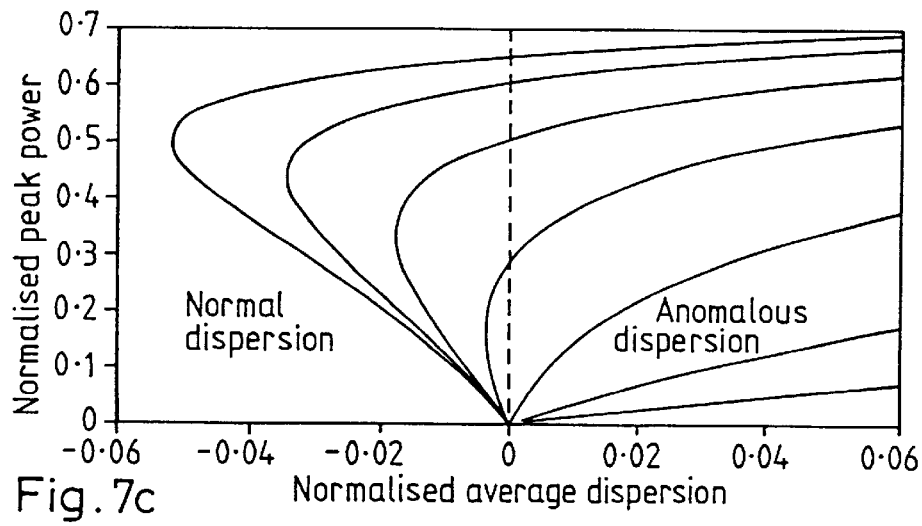

Comparing the soliton parameters for the cases shown in FIG. 5, the highest power, for a given average dispersion, is achieved for SSMF compensated by DCF (FIG. 5c). This case also gives the largest bandwidth in the normal average dispersion region, see FIG. 7. FIG. 7 shows the same data as in FIG. 5 but presented differently. The lines for constant map strength penetrate deeper into the normal dispersion regime for low $\delta$) and this corresponds, via the dispersion slope, to a larger bandwidth. This means that the chances for experimental observation of dispersion-managed solitons in normal average dispersion will be better for low $\delta$ (SSMF+DCF). The accessible bandwidth is in this case approximately ten times larger than in FIG. 7a (DSF+SSMF). Finally, FIG. 7 shows that the variation of the soliton power with average dispersion is lowest for low $\delta$. For systems using WDM, this gives an equalisation of the power in adjacent channels.

The region marked "higher order solutions" in FIG. 5 corresponds to a situation where the length of the anomalous dispersion fibre is longer than a soliton period. This region is excluded in FIG. 5 partly for the sake of clarity but also because in the variational approximation the same solution can always be achieved by a shorter anomalous fibre, i.e. with lower average dispersion.

Thus asymmetric dispersion maps can be used to optimise the performance of dispersion managed soliton systems. In particular, a system with SSMF compensated by DCF has higher soliton power, gives more bandwidth in normal average dispersion, and results in an equalisation of the channel power in WDM systems compared to symmetric systems and systems using dispersion-shifted fibres.

Figure 8A:
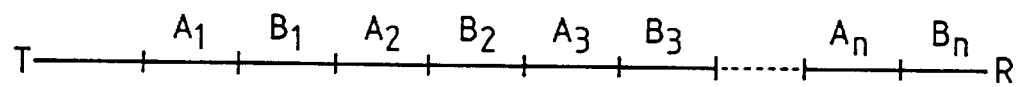
FIGS. 8 are a schematic diagram showing soliton or soliton-like communication system in accordance with a specific aspect of the invention.
Figure 8B:
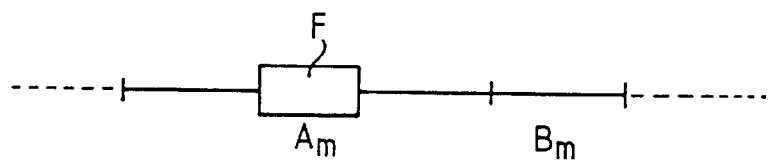
Figure 8C:
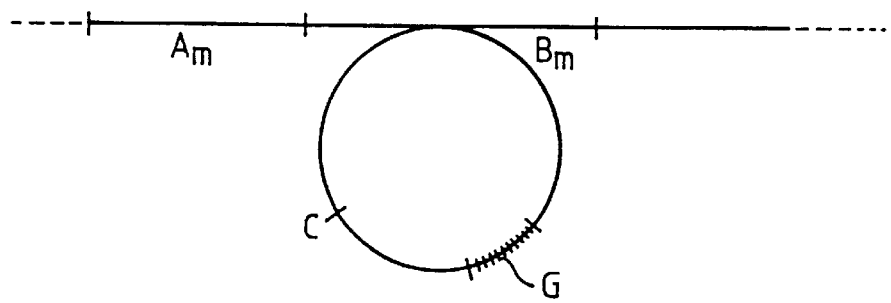

A soliton-based communications system is shown in FIG. 8. This comprises a source of solitons T and an optical waveguide consisting of successive elements $A_1$, $B_1$–$A_n$, $B_n$ having successively normal and anomalous dispersion. The elements $B_1$ etc. provide compensation for the dispersion in the elements $A_1$. The normal dispersive elements may be provided with a bandpass filter (FIG. 8b), ideally in the centre of the element where the bandwidth is minimum. Such filters will permit relaxation of the eparameter S so that S=2 is suitable with appropriate filters inserted. Dispersion compensation may be performed either with fibres having anomalous dispersion or with linear elements such as Bragg gratings G (FIG. 8c). In such an arrangement it will be necessary to provide a circulator C.

Dispersion management as herein described permits operation exactly at zero dispersion for a very high speed single channel or wavelength division multiplexing around the zero dispersion point. If WDM around zero dispersion is employed, care is needed to avoid channels with identical group velocities. If this cannot be avoided it will be necessary to include a 'double' step around the centre of the system.

Dispersion slope compensation may take place, either in the compensating element or periodically or at the end of the system. Sinusoidal variations in dispersion are also suitable for all the situations described above.

What is claimed is:

1. A soliton or soliton-like pulse-based optical communication system comprising a length of optical fiber divided into a plurality of sections wherein the average dispersion of the length of fiber is significantly different from the dispersion of each section, and wherein said system is a wavelength division multiplex system having a plurality of channels operable about a wavelength having substantially zero dispersion.

2. A soliton or soliton-like pulse-based optical communication system comprising a length of optical fiber divided into a plurality of sections wherein the average dispersion of the length of fiber is significantly different from the dispersion of each section, and wherein the system excludes channels having substantially equal group velocities.

3. A soliton or soliton-like pulse-based optical communication system comprising:

a length of optical fiber divided into a plurality of sections wherein the average dispersion of the length of fiber is significantly different from the dispersion of each section, and wherein the system excludes channels having substantially equal group velocities; and means for inhibiting coalescence of solitons in said channels having substantially equal group velocities.

4. A soliton or soliton-like pulse-based optical communication system comprising a length of optical fiber divided into a plurality of sections wherein the average dispersion of the length of fiber is significantly different from the dispersion of each section, and wherein the system includes at least one Bragg grating as a dispersion compensation element.

5. A soliton or soliton-like pulse-based optical communication system comprising:

a length of optical fiber divided into a plurality of sections wherein the average dispersion of the length of fiber is significantly different from the dispersion of each section, and a bandpass filter as a component of a normal dispersive element where the bandwidth is minimum.

6. A soliton or soliton-like pulse-based optical communication system according to claim 5, wherein said bandpass filter is positioned substantially in the center of said normal dispersive element.

7. A soliton or soliton-like pulse-based communication system comprising a length of optical fiber divided into a plurality of sections, wherein the average dispersion of the length of fiber is significantly different from the dispersion of each section, wherein the length of each fiber section is specified by the pulse duration ($\tau$) and the fiber dispersion parameter $\beta$.

8. A wavelength division multiplex optical communication system comprising:
   an optical fiber comprising a sequence of fiber sections, the sequence comprising an alternating sequence of a first section type having a normal dispersion ($\beta_1$) followed by a second section type having an anomalous dispersion ($\beta_2$), and wherein the average dispersion of the optical fiber is significantly closer to zero than the magnitudes of the first and second dispersions; and
   a plurality of wave length channels positioned about a wave length having near zero dispersion in the optical fiber.

9. A system according to claim 8, wherein the magnitudes of the first and second dispersions are significantly greater than the magnitude of the average dispersion of the fiber so that a soliton propagates through the fiber alternately expanding and compressing in shape as it propagates from one fiber section to the next.

10. A system according to claim 8, wherein said first section type has an associated length ($L_1$) and a first non-linear coefficient ($\gamma_1$), and said second type has a second associated length ($L_2$), and a second non-linear coefficient ($\gamma_2$), and wherein the map asymmetry ($\delta$) is given by the ratio ($\gamma_1/\beta_1$)/($\gamma_2/\beta_2$), and the map asymmetry has a value as to permit wave length division multiplexing about a wave length having near zero dispersion in the optical fiber.

11. A system according to claim 10, wherein the map asymmetry has a value of less than 1.

12. A system according to claim 11, wherein the first section type is single mode fiber and the second section type is dispersion compensation fiber.

13. A system according to claim 8, wherein the average dispersion of the fiber is zero.

14. A system according to claim 8, wherein the second section type includes a Bragg grating for dispersion compensation.

15. A system according to claim 8, wherein the first section type includes a bandpass filter.

16. An optical communication system arranged as a wavelength division multiplex system, and including an optical fiber dispersion management system comprising a sequence of fiber sections, the sequence comprising an alternating sequence of a first section type followed by a second section type,
   said first section type having an associated length ($L_1$), a first anomalous dispersion ($\beta_1$) and a first non-linear coefficient ($\gamma_1$), and of a second type having a second associated length ($L_2$), a second normal dispersion ($\beta_2$) and a second non-linear coefficient ($\gamma_2$),
   wherein the magnitudes of the first and second dispersions are significantly greater than the magnitude of the average dispersion of the fiber, whereby a soliton propagates through the system alternately expanding and compressing in shape as it propagates from one fiber section to the next,
   and wherein the average dispersion of the dispersion management system is zero.

17. An optical communication system arranged as a wavelength division multiplex system, and including an optical fiber dispersion management system comprising a sequence of fiber sections, the sequence comprising an alternating sequence of a first section type followed by a second section type,
   said first section type having an associated length ($L_1$), a first anomalous dispersion ($\beta_1$) and a first non-linear coefficient ($\gamma_1$), and of a second type having a second associated length ($L_2$), a second normal dispersion ($\beta_2$) and a second non-linear coefficient ($\gamma_2$),
   wherein the magnitudes of the first and second dispersions are significantly greater than the magnitude of the average dispersion of the fiber, whereby a soliton propagates through the system alternately expanding and compressing in shape as it propagates from one fiber section to the next,
   and wherein the average dispersion of the dispersion management system is normal.

* * * * *